(12) United States Patent
Kamm et al.

(10) Patent No.: US 8,523,728 B2
(45) Date of Patent: Sep. 3, 2013

(54) MULTI-SPEED TRANSMISSION

(71) Applicant: ZF Friedrichshafen AG, Friedrichshafen (DE)

(72) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/709,674

(22) Filed: Dec. 10, 2012

(65) Prior Publication Data

US 2013/0123060 A1    May 16, 2013

Related U.S. Application Data

(62) Division of application No. 13/565,242, filed on Aug. 2, 2012, and a division of application No. 13/179,922, filed on Jul. 11, 2011, now Pat. No. 8,257,218, and a division of application No. 12/959,976, filed on Dec. 3, 2010, now Pat. No. 7,980,986, and a division of application No. 11/773,640, filed on Jul. 5, 2007, now Pat. No. 7,892,137.

(30) Foreign Application Priority Data

Jul. 6, 2006   (DE) .......................... 10 2006 031 234

(51) Int. Cl.
*F16H 3/62*    (2006.01)

(52) U.S. Cl.
USPC .......................................... 475/275; 475/277

(58) Field of Classification Search
None
See application file for complete search history.

(56) References Cited

U.S. PATENT DOCUMENTS

| | | | |
|---|---|---|---|
| 4,345,490 A | 8/1982 | Madson | |
| 6,176,803 B1 | 1/2001 | Meyer et al. | |
| 6,634,980 B1 | 10/2003 | Ziemer | |
| 6,960,149 B2 | 11/2005 | Ziemer | |
| 6,991,578 B2 | 1/2006 | Ziemer | |
| 7,014,589 B2 | 3/2006 | Stevenson | |

(Continued)

FOREIGN PATENT DOCUMENTS

| | | |
|---|---|---|
| DE | 42 34 572 A1 | 4/1994 |
| DE | 199 49 507 A1 | 4/2001 |

(Continued)

*Primary Examiner* — Erin D Bishop
(74) *Attorney, Agent, or Firm* — Davis & Bujold, PLLC

(57) ABSTRACT

The 8-speed transmission which comprises an input shaft (AN), an output shaft (AB), four planetary gearsets (RS1, RS2, RS3, RS4), eight rotary shafts (1, 2, 3, 4, 5, 6, 7, 8), and five shifting elements (A, B, C, D, E). The input shaft is directly connected to the fourth planetary gear set while the output shaft is directly connected to the third planetary gear. A third shaft directly connects one element of the first planetary gear set with one element of the fourth planetary gear set. A fifth shaft directly connects one element of the second planetary gear set with one element of the third planetary gear set. A sixth shaft directly connects one element of the first planetary gear set with one element of the third planetary gear set. A seventh shaft directly connects one element of the fourth planetary gear set with one element of the fifth shifting element.

10 Claims, 10 Drawing Sheets

(56) References Cited

U.S. PATENT DOCUMENTS

| | | |
|---|---|---|
| 7,018,319 B2 | 3/2006 | Ziemer |
| 7,497,802 B2 | 3/2009 | Kamm et al. |
| 7,527,576 B2 | 5/2009 | Kamm et al. |
| 7,597,646 B2 | 10/2009 | Kamm et al. |
| 7,621,840 B2 | 11/2009 | Kamm et al. |
| 7,632,207 B2 | 12/2009 | Kamm et al. |
| 7,635,315 B2 | 12/2009 | Kamm et al. |
| 7,645,207 B2 | 1/2010 | Kamm et al. |
| 7,645,208 B2 | 1/2010 | Kamm et al. |
| 7,651,429 B2 | 1/2010 | Kamm et al. |
| 7,670,246 B2 | 3/2010 | Kamm et al. |
| 7,699,741 B2 | 4/2010 | Hart et al. |
| 7,713,161 B2 | 5/2010 | Kamm et al. |
| 7,789,792 B2 | 9/2010 | Kamm et al. |
| 7,892,137 B2 | 2/2011 | Kamm et al. |
| 7,980,986 B2 | 7/2011 | Kamm et al. |
| 8,251,855 B2 | 8/2012 | Diosi et al. |
| 2004/0048716 A1 | 3/2004 | Ziemer |
| 2008/0171628 A1 | 7/2008 | Wittkopp et al. |
| 2008/0171629 A1* | 7/2008 | Hart et al. .................. 475/276 |
| 2008/0300093 A1 | 12/2008 | Borgerson |

FOREIGN PATENT DOCUMENTS

| | | |
|---|---|---|
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 032 001 A1 | 2/2007 |
| WO | 94/09292 A1 | 4/1994 |

* cited by examiner

| GEAR | ENGAGED SHIFTING ELEMENTS ||||| RATIO i | STEP φ |
|---|---|---|---|---|---|---|---|
| | BRAKE || CLUTCH ||| | |
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.29 | 1.30 |
| 6 | | | ● | ● | ● | 1.00 | 1.29 |
| 7 | ● | | ● | ● | | 0.84 | 1.19 |
| 8 | ● | | | ● | ● | 0.67 | 1.26 |
| R | ● | ● | | ● | | -3.28 | TOTAL 7.05 |

Fig. 4

| GEAR | ENGAGED SHIFTING ELEMENTS |||||  RATIO i | STEP φ |
|---|---|---|---|---|---|---|---|
| | BRAKE || CLUTCH ||| | |
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.29 | 1.29 |
| 6 | | | ● | ● | ● | 1.00 | 1.29 |
| 7 | ● | | ● | ● | | 0.84 | 1.20 |
| 8 | ● | | | ● | ● | 0.67 | 1.25 |
| R | ● | ● | | ● | | -3.13 | TOTAL 7.05 |

Fig. 8

MULTI-SPEED TRANSMISSION

This application is a divisional of U.S. patent application Ser. No. 13/565,242 filed Aug. 2, 2012, which is a divisional of U.S. patent application Ser. No. 13/179,922 filed Jul. 11, 2011 which is now U.S. Pat. No. 8,257,218 issue Sep. 4, 2012, which is a divisional of U.S. application Ser. No. 12/959,976 filed Dec. 3, 2010, which is now U.S. Pat. No. 7,980,986 issued Jul. 5, 2011, which is a divisional of U.S. application Ser. No. 11/773,640 filed Jul. 5, 2007, which is now U.S. Pat. No. 7,892,137 issued Feb. 22, 2011, which claims priority from German patent application serial no. 10 2006 031 234.1 filed Jul. 6, 2006.

FIELD OF THE INVENTION

The invention concerns a multi-speed transmission planetary design, in particular an automatic transmission for a motor vehicle, comprising an input shaft, an output shaft, four planetary gearsets, at least eight rotary shafts, as well as five shifting elements, whose selective engagement produces different transmission ratios between input shaft and output shaft, so that eight forward gears and at least one reverse gear can be realized.

BACKGROUND OF THE INVENTION

Automatic transmissions, particularly for motor vehicles, in the state of the art, include planetary gearsets that are shifted by way of friction or shifting elements, such as clutches and brakes, and a starting element, such as a hydrodynamic torque converter or a fluid clutch, subjected to a slip effect and optionally provided with a lockup clutch.

Within the scope of the Applicant's DE 101 15 983 A1 is described a multi-speed transmission with an input shaft connected to a front-mounted gear train and a rear-mounted gear train connected to an output shaft, and a maximum of seven shifting elements, the selective shifting of which implements at least seven forward gears without range shifts. The front-mounted gear train is composed of a shiftable or non-shiftable planetary gearset, or a maximum of two non-shiftable planetary gearsets that are coupled to each other. The rear-mounted gear train is configured as a two-carrier four-shaft transmission with two shiftable planetary gearsets and features four free shafts. The first free shaft of this two-carrier four-shaft transmission is connected to the first shifting element, the second free shaft to the second and third shifting element, the third free shaft to the fourth and fifth shifting element, and the fourth free shaft is connected to the output shaft. For a multi-speed transmission with a total of six shifting elements, it is proposed according to the invention to connect the third free shaft or the first free shaft of the rear-mounted gear train additionally to a sixth shifting element. For a multi-speed transmission with a total of seven shifting elements, it is proposed according to the invention to connect the third free shaft additionally to a sixth shifting element, and the first free shaft additionally to a seventh shifting element.

Several other multi-speed transmissions are also known from the Applicant's DE 101 15 995 A1, which are provided with four shiftable planetary gearsets that are coupled to each other and six or seven non-positive shifting elements, by way of whose selective engagement a rotational speed of an input shaft of the transmission can be transferred to an output shaft of the transmission such that nine or eleven forward gears and at least one reverse gear can be engaged. Depending on the gearbox arrangement, two or three shifting elements are engaged in each gear, such that when shifting from one gear into the next higher or next lower gear in order to avoid group shifts, only one engaged shifting element is disengaged, and one shifting element that was previously disengaged is engaged.

In addition, the unpublished patent application DE 10 2005 002 337.1 of the Applicant proposes a multi-speed transmission with an input shaft, an output shaft, four individual planetary gearsets that are coupled to each other, and five shifting elements, with which eight forward gears can be shifted into without range shifts, that is, in such a way, that when shifting from a forward gear into the next higher or lower forward gear, only one of the previously engaged shifting elements is disengaged and only one of the previously disengaged shifting elements is engaged. This multi-speed transmission also features one reverse gear. In all forward gears and in the reverse gear, three shifting elements are engaged at any one time. With regard to the kinematic coupling of the four planetary gearsets to each other and to the input and output shafts, it is provided that a carrier of the fourth planetary gearset and the input shaft are connected to each other and form a first shaft of the transmission; a carrier of the third planetary gearset and the output shaft are connected to each other and form a second shaft of the transmission; a sun gear of the first planetary gearset and a sun gear of the fourth planetary gearset are connected to each other and form a third shaft of the transmission; a ring gear of the first planetary gearset forms a fourth shaft of the transmission; a ring gear of the second planetary gearset and a sun gear of the third planetary gearset are connected to each other and form the fifth shaft of the transmission; a carrier of the first planetary gearset and a ring gear of the third planetary gearset are connected to each other and form a sixth shaft of the transmission; a sun gear of the second planetary gearset and a gear of the fourth planetary gearset are connected to each other and form a seventh shaft of the transmission; and a carrier of the second planetary gearset forms an eighth shaft of the transmission. Regarding the kinematic coupling of the five shifting elements to the four planetary gearsets and to the input and output shafts, it is provided that the first shifting element is arranged within the power flow between the third shaft and a housing of the transmission, the second shifting element, between the fourth shaft and the housing of the transmission, the third shifting element, between the first and fifth shafts, the fourth shifting element either, between the eighth and second shaft or between the eighth and sixth shaft, and the fifth shifting element is either between the seventh and fifth shafts, between the seventh and eighth or between the fifth and eighth shaft.

Automatically shiftable motor vehicle transmissions in planetary design have in general already been described many times in the state of the art and are subjected to constant further development and improvement. These transmission should therefore feature a sufficient number of forward gears, as well as one reverse gear, and transmission ratios that are very well suited for motor vehicles, with a high total transmission ratio spread, and with favorable progressive ratios. In addition, they should enable a high startup gear ratio in forward direction and contain a direct gear for use in both passenger cars and commercial vehicles. In addition, these transmissions should not have a complicated construction and should require a small number of shifting elements and avoid double shifting within a sequential shifting method so that only one shifting element is activated at one time when shifting within defined gear ranges.

It is an object of the invention to propose a multi-speed transmission of the type discussed above with at least eight shiftable forward gears, without range shifting, and at least one reverse gear, in which the lowest possible number of shifting elements is required with the use of a total of four planetary gearsets. In addition, the transmission should feature a large ratio spread with comparatively harmonic gear stepping, and at least in the main driving gears, a favorable degree of efficiency, that is, comparatively little drag and gearing loss.

SUMMARY OF THE INVENTION

The multi-speed planetary transmission according to the invention is based on the type of gearbox diagram of the Applicant's patent application DE 10 2005 002 337.1 and features an input shaft, an output shaft, four planetary gearsets that are coupled to each other, at least eight rotary shafts, as well as five shifting elements (two brakes and three clutches), whose selective engagement produces different transmission ratios between the input shaft and the output shaft, so that eight forward gears an one reverse gear are realizable. In each gear, three of the of the five shifting elements are respectively engaged, such that when changing from a forward gear into the next higher or lower forward gear, only one of the previously engaged shifting elements is disengaged, and only one of the previously disengaged shifting elements is engaged.

According to the invention, it is proposed that:
a carrier of the fourth planetary gearset and the input shaft are permanently connected to each other and form the first shaft of the transmission,
a carrier of the third planetary gearset and the output shaft are permanently connected to each other and form the second shaft of the transmission,
a sun gear of the first planetary gearset and a sun gear of the fourth planetary gearset are permanently connected to each other and form the third shaft of the transmission,
a ring gear of the first planetary gearset forms the fourth shaft of the transmission,
a carrier of the second planetary gearset and a sun gear of the third planetary gearset are permanently connected to each other and form the fifth shaft of the transmission,
a carrier of the first planetary gearset and a ring gear of the third planetary gearset are permanently connected to each other and form the sixth shaft of the transmission,
a sun gear of the second planetary gearset and a ring gear of the fourth planetary gearset are permanently connected to each other and form the seventh shaft of the transmission,
a ring gear of the second planetary gear forms the eighth shaft of the transmission,
the first shifting element is arranged within the power flow between the third shaft and a housing of the transmission,
the second shifting element is arranged within the power flow between the fourth shaft and the housing of the transmission,
the third shifting element is arranged within the power flow between the first and fifth shaft of the transmission,
the fourth shifting element is arranged within the power flow between the fifth and eighth shaft of the transmission, and
the fifth shifting element is arranged within the power flow between either the fifth and seventh shaft or between the seventh and eighth shaft of the transmission.

The multi-speed transmission according to the invention differs from the multi-speed transmission of the generic kind according to DE 10 2005 002 337.1 in that the carrier of the second planetary gearset and the sun gear of the third planetary gearset are permanently connected to each other as the fifth shaft of the transmission, and the eighth shaft of the transmission is now formed by the ring gear of the second planetary gearset.

As in the generic multi-speed transmission according to DE 10 2005 002 337.1, it is also applicable to the multi-speed transmission according to the invention that the multi-speed transmission according to the invention that the first forward gear is produced by engaging the first, second, and third shifting elements; the second forward gear is produced by engaging the first, second, and fifth shifting elements; the third forward gear is produced by engaging the second, third, and fifth shifting elements; the fourth forward gear is produced by engaging the second, fourth, and fifth shifting elements; the fifth forward gear is produced by engaging the second, third, and fourth shifting elements; the sixth forward gear is produced by engaging the third, fourth, and fifth shifting elements; the seventh forward gear is produced by engaging the first, third, and fourth shifting elements; the eighth forward gear is produced by engaging the first, fourth, and fifth shifting elements; and the reverse gear is produced by engaging the first, second, and fourth shifting elements.

Three of the four planetary gearsets are configured as so-called negative planetary gearsets, whose respective planetary gears mesh with the sun gear and ring gear of the respective planetary gearset. One of the four planetary gearsets—specifically, the second planetary gearset—is configured as a so-called positive planetary gearset with meshing inner and outer planetary gears, wherein these inner planetary gears also mesh with the sun gear of this positive planetary gearset, and these outer planetary gears also mesh with the ring gear of this positive planetary gearset. Regarding the spatial arrangement of the four planetary gearsets in the housing of the transmission, an advantageous configuration proposes that the four planetary gearsets be arranged in a sequential order of "first, fourth, second, third planetary gearset".

The spatial arrangement of the shifting elements of the multi-speed transmission according to the invention inside the transmission housing is, in principle, limited only by the measurements and the external shape of the transmission housing. Numerous suggestions regarding the spatial arrangement and construction design of the shifting elements can be seen, for example, in the generic patent application of DE 10 2005 002 337.1.

For example, in a variant of the shifting element arrangement favorable for a standard transmission, it can be provided that the first and second shifting elements are arranged, with respect to the spatial layout at least partially within an area located radially above the first and or fourth planetary gearsets, and that the third shifting element can be arranged from the spatial point of view axially between the second and third planetary gearsets, and that the fourth shifting element is also arranged from the spatial point of view within an area located axially between the second and third planetary gearsets, if it is kinematically coupled directly to the second shaft of the transmission, or that the fourth shifting element is arranged from the spatial point of view at least in part within an area located radially above the second planetary gearset, if it is kinematically coupled directly to the sixth shaft of the transmission, and the fifth shifting element is also arranged, with respect for the spatial layout, either within an area located axially between the second and third planetary gearsets, or within an area located axially between the fourth and second planetary gearsets.

The embodiment of the multi-speed transmission according to the invention produces transmission ratios that are particularly suitable for passenger cars, with a large total transmission ratio spread in harmonic gear stepping. In addition, with the multi-speed transmission according to the invention, the material requirements for construction are comparatively small due to the small number of shifting elements, that is, two brakes and two clutches. In addition, the multi-speed transmission also displays good efficiency in all gears, on one hand, due to the low drag loss, because only two shifting elements are disengaged in each gear and, on the other hand, as a result of the low gearing losses in the simply constructed individual planetary gearsets.

In addition, it is advantageously possible with the multi-speed transmission according to the invention to initiate driving the vehicle using a hydrodynamic converter, an external starting clutch, or also with other suitable external starting elements. It is also conceivable to enable a drive initiating process with a starting element that is integrated into the transmission. Advantageously suitable for this process is one of the two brakes, which is activated in the first and second forward gear and in the reverse gear.

In addition, the multi-speed transmission according to the invention is designed such that it is adaptable to different power train arrangements in both power flow directions and from a spatial point of view. It is possible, for example, without special constructive measures, to arrange the transmission input and output alternately co-axially or axially parallel with respect to each other.

For example, for use with input and output shafts that run co-axially with respect to each other, it is practical that the first planetary gearset is the planetary gearset that faces the engine driving the inventive planetary gearset group of the transmission. Depending on the spatial arrangement of the five shifting elements inside the transmission housing, it can be provided that, in each case, no more than one shaft of the transmission passes in an axial direction through the center the four planetary gearsets. In relation to the shifting element arrangement described above, in connection with the arrangement of the four planetary gearsets co-axially side-by-side in the sequential order of "first, fourth, second, third planetary gearset" and the arrangement of the first and second shifting elements near the drive input, only one shaft, that is, the first shaft or the input shaft of the transmission, passes in an axial direction through the center of the first and fourth planetary gearsets. The constructive design of the pressurizing medium and lubricant supply to the servo unit units of the individual shifting elements is correspondingly simple.

For use with input and output shafts that are axially parallel or are at an angle with respect to each other, the first or the third planetary gearset can be arranged on the side of the transmission housing facing the drive motor and is functionally connected to the drive shaft. If the first planetary gearset faces the transmission drive, it can be provided—as with the co-axial arrangement of the input and output shafts—depending on the spatial arrangement of the five shifting elements inside the transmission housing—that no more than one shaft of the transmission passes in an axial direction through each of the four planetary gearsets, in particular that only one shaft, specifically the first shaft of the transmission, passes through the first and fourth planetary gearset.

On the other hand, if the third planetary gearset faces the drive of the transmission, and the input and output shafts are not arranged co-axially with respect to each other, no shaft of the transmission has to pass in an axial direction through the first and fourth planetary gearsets. In connection with the arrangement, cited above, of the third, fourth, and fifth shifting elements, only one shaft, that is, the first shaft or the input shaft of the transmission, passes in an axial direction through the center of only two of the four planetary gearsets, that is, the second and third planetary gears sets.

In any case, the third shaft of the transmission, which is formed in sections by the sun gears of the first and fourth planetary gearsets, can be rotatably mounted on a hub that is affixed to the housing. If the first planetary gearset faces the input of the transmission, the cited hub, which is affixed to the housing, is an element of the housing wall on the input side; otherwise it is an element of the housing wall opposite the drive engine.

BRIEF DESCRIPTION OF THE DRAWINGS

The invention will now be described by way of example, with reference to the accompanying drawings. The same or comparable components are provided with the same reference numerals. In the drawings:

FIG. 4 shows an exemplary shift pattern for a multi-speed transmission according to FIGS. 1, 2, and 3;

FIG. 8 shows an exemplary shift pattern for the multi-speed transmission according to FIGS. 5, 6, and 7.

DETAILED DESCRIPTION OF THE PREFERRED EMBODIMENTS

Figure 1:
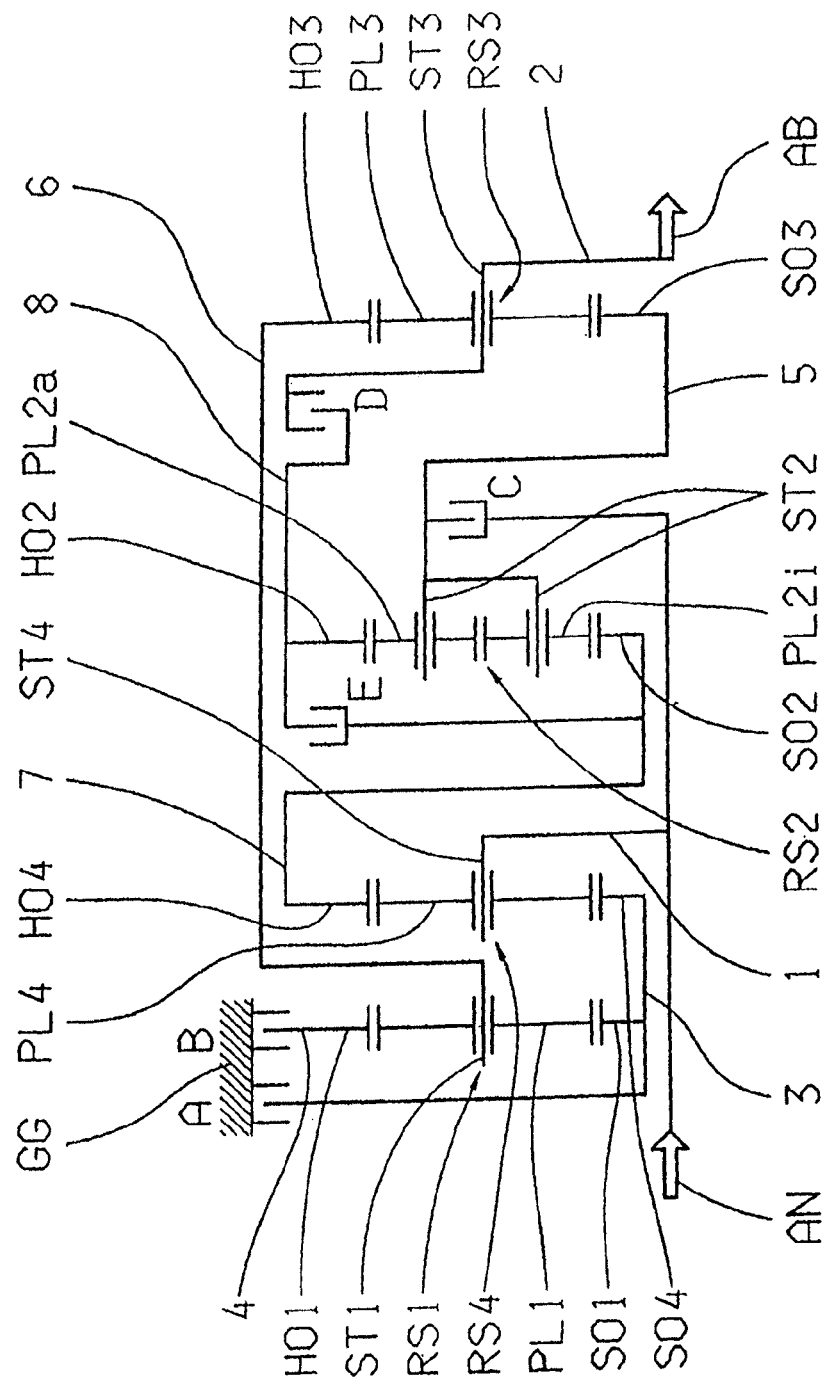
FIG. 1 shows a schematic representation of an exemplary embodiment of a multi-speed transmission according to the invention.

FIG. 1 shows a first exemplary embodiment of a multi-speed transmission according to the invention in schematic representation. The transmission comprises an input shaft AN and an output shaft AB, as well as four planetary gearsets RS1, RS2, RS3, RS4 and five shifting elements A, B, C, D, E, which are all arranged in a housing GG of the transmission. In this exemplary embodiment, the four planetary gearsets RS1, RS2, RS3, RS4, are arranged co-axially, one after the other, in an axial direction in the sequential order of "RS1, RS4, RS2, RS3". The planetary gearsets RS1, RS3 and RS4 are configured as simple negative planetary gearsets. As is generally known, a negative planetary gearset features planetary gears that mesh with sun and ring gears of this planetary set. The ring gears of the planetary gearsets RS1, RS3, RS4, are identified with HO1, HO3 and HO4; the sun gears are identified with SO1, SO3 and SO4; the planetary gears are identified with PL1, PL3 and PL4; and the carriers, on which the planetary gears are rotatably mounted, are identified with ST1, ST3 and ST4. The planetary gearset RS2 is configured as a simple positive planetary gearset within double planetary design. As is generally known, a positive planetary gearset features inner and outer planetary gears that mesh with each other, wherein the inner planetary gears also mesh with the sun gear of this planetary gearset, and the outer planetary gears also mesh with the ring gear of this planetary set. The ring gear of the planetary gearset RS2 is identified with HO2, the sun gear is identified with SO2, the inner planetary gears are identified with PL2$i$, the outer planetary gears are identified with PL2$a$, and the carrier, on which the inner and outer planetary gears PL2$i$, PL2$a$ are rotatably mounted, is identified with ST2. The shifting elements A and B are configured as brakes, which in the exemplary embodiment presented herein are both configured as non-positive, shiftable disk brakes, which in another embodiment can, of course, be configured as non-positive shiftable band brakes, for example, and also as non-positive shiftable claw brakes or conical brakes. The shifting elements C, D and E are configured as clutches, which in the exemplary embodiment shown are all configured as non-positive, shiftable disk clutches, and can naturally also be configured, for example, as non-positive shiftable claw or conical clutches. With these five shifting elements A to E, eight forward gears and at least one reverse gear can be implemented by selective shifting. The multi-speed transmission according to the invention therefore features at least eight rotary shafts that are identified with reference numerals 1 to 8.

With regard to the kinematic coupling of the individual elements of the four planetary gearsets RS1, RS2, RS3, RS4 to each other and to the input and output shafts AN, AB the following is provided: the carrier ST4 of the fourth planetary gearset and the input shaft AN are permanently connected to each other and form the shaft 1. The carrier ST3 of the third planetary gearset RS3 and the output shaft AB are permanently connected with each other and form the shaft 2. The sun gear SO1 of the first planetary gearset RS1 and the sun gear SO4 of the fourth planetary gearset RS4 are permanently connected to each other and form the shaft 3. The ring gear HO1 of the first planetary gearset RS1 forms the shaft 4. The carrier ST2 of the second planetary gearset RS2 and the sun gear SO3 of the third planetary gearset RS3 are permanently connected to each other and form the shaft 5. The carrier ST1 of the first planetary gearset RS1 and the ring gear HO3 of the third planetary gearset RS3 are permanently connected to each other and form the shaft 6. The sun gear SO2 of the second planetary gearset RS2 and the ring gear HO4 of the fourth planetary gearset RS4 are permanently connected to each other and form the shaft 7. The ring gear HO2 of the second planetary gearset RS2 forms the shaft 8.

With regard to the kinematic coupling of the five shifting elements A to E to the above described shafts 1 to 8 of the transmission, the multi-speed transmission according to FIG. 1 provides the following: the brake A is arranged as first shifting element within the power flow between the shaft 3 and a housing GG of the transmission. The brake B is arranged as second shifting element within the power flow between the shaft 4 and the housing GG. The clutch C is arranged as third shifting element within the power flow between the shaft 1 and the shaft 5. The clutch D is arranged as fourth shifting element between the shaft 2 and the shaft 8. The clutch E is arranged as fifth shifting element within the power flow between the shaft 7 and the shaft 8 and locks the second planetary gearset RS2 in the engaged or shifted state.

In the exemplary embodiment shown in FIG. 1, the first planetary gearset RS1 is the gearset of the transmission that is near the input, and the third planetary gearset RS3 is the gearset near the output of the transmission, wherein the input shaft AN and the output shaft AB are arranged, for example, co-axially with respect to each other. It is obvious to the person skilled in the art that this transmission can be modified without great effort so that the input and output shafts are no longer arranged co-axially with respect to each other, but, for example, axially parallel or at an angle with respect to each other. With an arrangement of this type, the person skilled in the art will, if needed, arrange the input of the transmission close to the third planetary gearset RS3, that is, on the side of the third planetary gearset RS3 that faces away from the planetary gearset RS1.

In principle, the spatial arrangement of the shifting elements within the transmission is optional in the exemplary embodiment of a multi-speed transmission according to the invention shown in FIG. 1 and is limited only by the measurements and the external shape of the transmission housing GG.

In the exemplary embodiment shown in FIG. 1, the two brakes A, B are arranged, with respect to the spatial layout, within the area of the first planetary gearset RS1, which is near the input in this case, and axially side by side, wherein the kinematic connection of the two brakes A, B to the first planetary gearset RS1 requires that the brake B be nearer to the fourth planetary gearset RS4, which is adjacent to the first planetary gearset RS1, than to the brake A or that the brake A be arranged nearer to the drive of the transmission than the brake B. With respect to the spatial layout, the brake B is at least partially arranged within an area located radially above the first planetary gearset RS1, and the brake A is arranged correspondingly on the side (near the input) of the first planetary gearset RS1 that faces away from the fourth planetary gearset RS4. An internal disk carrier of the brake A forms a section of the shaft 3 of the transmission and is connected in a rotationally fixed manner to the sun gear SO1 of the first planetary gearset RS1 on the side of the first planetary gearset RS1 that faces away from the fourth planetary gearset RS4. The shaft 3 is configured by sections as a kind of sun shaft that connects the sun gears SO1, SO4 of the planetary gearsets RS1,RS4 to each other. The shaft 3 can therein be rotatably mounted on either the input shaft AN or a hub (not shown in more detail in FIG. 1) that is attached to the transmission housing. An interior disk carrier of the brake B forms a section of the shaft 4 of the transmission and is attached in a rotationally fixed manner to the ring gear HO1 of the first planetary gearset RS1. The external disk carriers of the brakes A and B can each be integrated in the housing GG or also configured as separate components, which are then attached in a rotationally fixed manner to the housing GG. The servo unit units necessary for actuating the friction elements of the two brakes A, B are not represented in detail in FIG. 1 for the sake of simplicity and can, for example, be mounted in the transmission housing GG or a housing cover that is affixed on the transmission housing.

The person skilled in the art will modify this example of spatial arrangement of the two brakes A, B as needed, without particular inventive effort. The brake A can be arranged, at least in part, radially above the first planetary gearset RS1, and the brake B can be arranged, at least in part, radially above the fourth planetary gearset RS4. In yet another embodiment, the two brakes A, B can, for example, be arranged on the side of the first planetary gearset RS1 that faces away from the fourth planetary gearset RS4, radially one above the other and axially adjacent to the first planetary gearset RS1, wherein the brake B, for example, is then arranged on a larger diameter than the brake A.

As can also be seen from FIG. 1, the clutches C and D—at least their disk packets—are arranged from a spatial point of view within an area located axially between the second and third planetary gearsets RS2, RS3, while the clutch E—at least its disk packet—is arranged from a spatial point of view within an area located axially between the fourth and second planetary gearset RS4, RS2. The servo units of the three clutches C, D, E, required to activate these disk sets, are not shown in detail in FIG. 1 for the purpose of simplification.

In the example, the clutches C, D are arranged essentially axially adjacent, with the disk set of the clutch D is arranged at a larger diameter than the disk set of the clutch C. The clutch C is herein arranged axially adjacent to the second planetary gearset RS2, therefore closer to the second planetary gearset RS2 than to clutch D. Accordingly, the clutch D is arranged axially adjacent to the third planetary gearset RS3, therefore closer to the third planetary gearset RS3 than the clutch C. An external disk carrier of the clutch C is connected to the carrier ST2 of the planetary gearset RS2 on the side of the disk set of the clutch C that faces the second planetary gearset RS2 and is also connected to the sun gear SO3 of the third planetary gearset RS3 on the side of the disk set of the clutch C that faces the third planetary gearset RS3 and, therefore, can be identified as a section of the shaft 5 of the transmission. An internal disk carrier of the clutch C is connected to the carrier ST4 of the fourth planetary gearset RS4 and to the input shaft AN of the transmission and can therefore also be identified as a section of the shaft 1 of the transmission. In a simple manner, the servo unit required for actuating the disk set of the clutch C can be mounted in an axially displaceable manner on the internal disk carrier of the clutch C and, therefore, rotates constantly at the rotational speed of the shaft 1, for example, the input shaft AN. However, the servo unit of the clutch C can be preferably arranged inside a cylindrical chamber formed by the external disk carrier of the clutch C and mounted in an axially displaceable manner on this external disk carrier of clutch C and, therefore, constantly rotates with the rotational speed of the shaft 5. In order to compensate for the rotational pressure of the rotating pressure chamber of this servo unit, the clutch C can have a known dynamic pressure compensation.

An external disk carrier of the clutch D is connected on the side of the disk set of the clutch D facing the third planetary gearset RS3 of the disk set of the clutch D to the carrier ST3 of this planetary gearset RS3 and, via this carrier ST3, also to the output shaft AB of the transmission and, therefore, can be identified as a section of the shaft 2 of the transmission. An internal disk carrier of the clutch D is connected, on the side of the disk set of the clutch D that faces the second planetary gearset RS2 to the ring gear HO2 of the second planetary gearset RS2 and can therefore also be identified as a section of the shaft 8 of the transmission. Over its axial length, this shaft 8 completely overlaps the clutch C. The servo unit necessary to actuate the disk set of the clutch D can be arranged in a simple manner inside the cylindrical chamber formed by the external disk carrier of the clutch D and can be mounted in an axially displaceable manner on the external disk carrier of the clutch D and, therefore, can constantly rotate at the rotational speed of the shaft 2 or the rotational speed of the output. However, it can, for example, also be provided that the servo unit of the clutch D is mounted in an axially displaceable manner on the internal disk carrier of the clutch D and, therefore, rotates constantly at the rotational speed of the shaft 8. In order to compensate for the rotational pressure of the rotating pressure chamber of the servo unit of the clutch D, known dynamic pressure compensation can be provided.

For the person skilled in the art, it is easy to see that, differing from FIG. 1, in another embodiment of the transmission, the disk set of the clutch D can also be arranged, at least in part, radially above the disk set of the clutch C, wherein the axial distance for installation of the transmission is shortened.

In the exemplary embodiment shown in FIG. 1, the clutch E, which locks the second planetary gearset RS2 in the engaged or shifted state, is arranged within an area located axially between the second planetary gearset RS2 and the fourth planetary gearset RS4, therein axially directly adjacent to the secondary planetary gearset RS2. An external disk carrier of the clutch E is connected to the ring gear HO2 of the second planetary gearset RS2 on its side facing the planetary gearset and, therefore, forms an additional section of the shaft 8 of the transmission. An internal disk carrier of the clutch E is connected to the sun gear SO2 of the second planetary gearset RS2 and to the ring gear HO4 of the fourth planetary gearset RS4, and can therefore be identified as a section of the shaft 7 of the transmission. The servo unit required for the actuation of the disk set of the clutch E can be simply mounted in an axially displaceable manner on the internal disk carrier of the clutch E and, therefore, rotates constantly at the rotational speed of the shaft 7. The servo unit of the clutch E can, however, also be mounted in an axially displaceable manner on the external disk carrier of the clutch E and, therefore, rotates constantly at the rotational speed of the shaft 8. In order to compensate for the rotational pressure of the pressure chamber of the servo unit of the clutch E, known dynamic pressure compensation can be provided.

According to the gearset arrangement corresponding to the sequential order of "RS1-RS4-RS2-RS3" of the four planetary gearsets RS1, RS2, RS3, RS4, and corresponding to the arrangement of the three clutches C, D, E within an area located axially between the fourth and third planetary gearset RS4, RS3, the shaft 6 of the transmission completely overlaps within its axial length the fourth planetary gearset RS4, the clutch E, the second planetary gearset RS2, and the two clutches C and D. At the same time, the shaft 6 radially encloses the shaft 7 and the shaft 8 and a section of the shaft 2.

It is expressly pointed out that the arrangement of the five shifting elements A, B, C, D, E stated above is to be considered as an example only. If required, the person skilled in the art will modify, in this example, the spatial arrangement of the five shifting elements A, B, C, D, E; numerous proposals for this can be seen, for example, in the patent application of the generic kind DE 10 2005 002 337.1.

Figure 2:
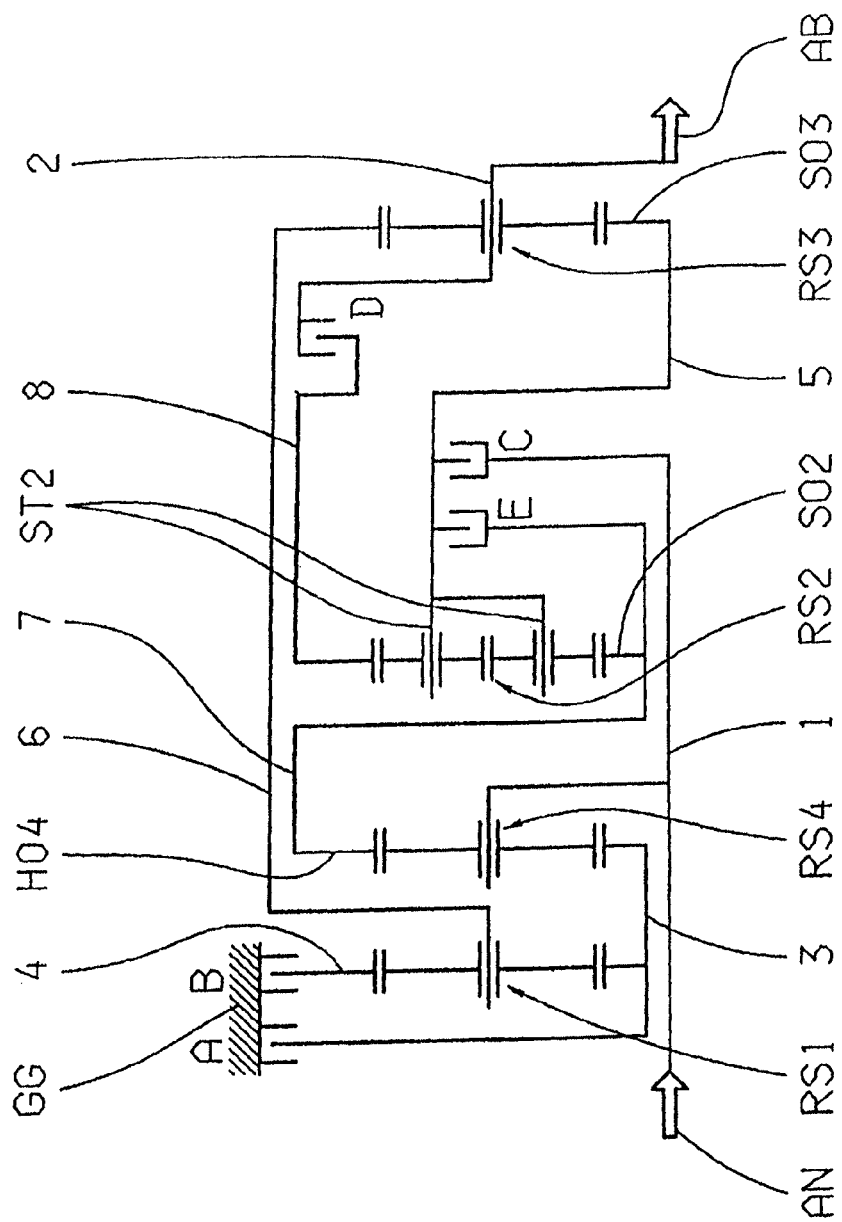
FIG. 2 shows a schematic representation of a second exemplary embodiment of a multi-speed transmission according to the invention based on the gear arrangement according to FIG. 1.
Figure 3:
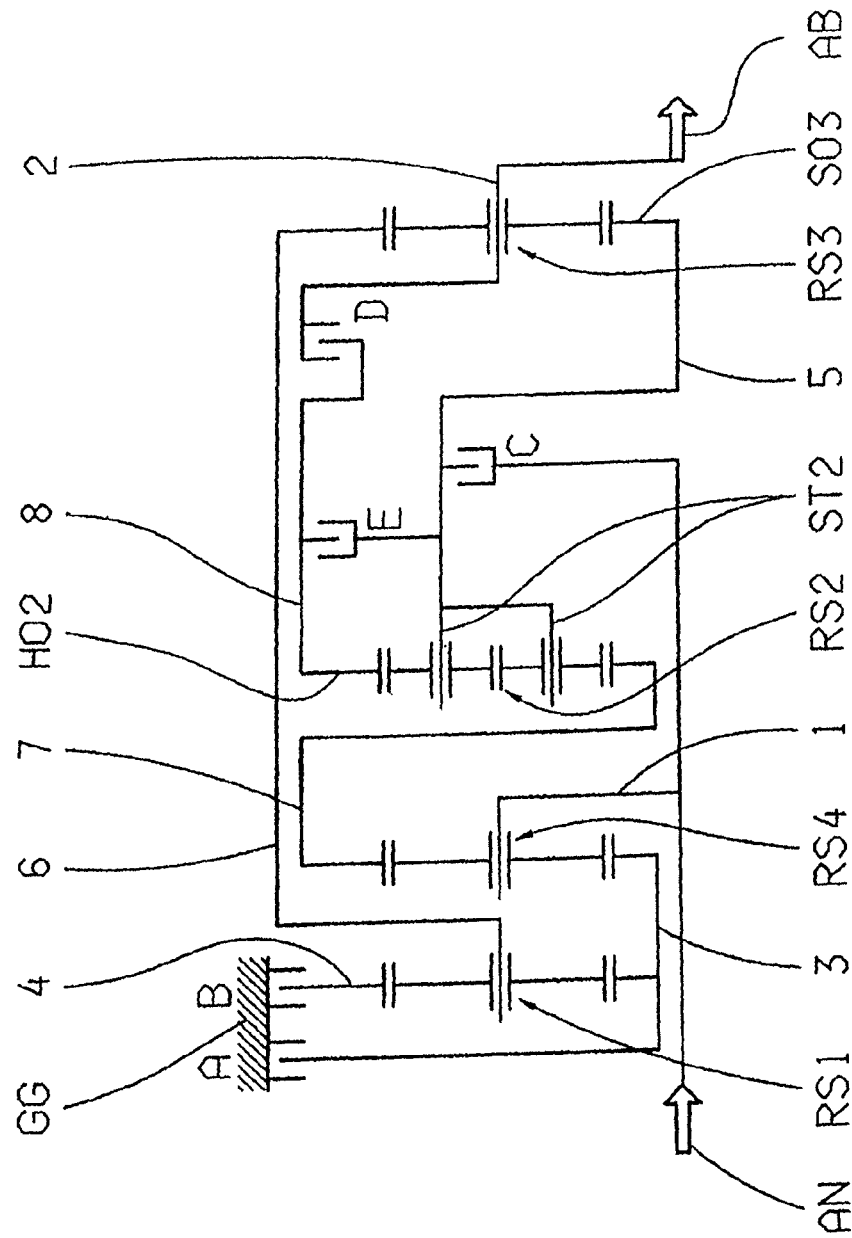
FIG. 3 shows a schematic representation of a third example of a multi-speed transmission according to the invention based on the gear arrangement according to FIG. 1.

Based on the consideration that the clutch E, being the fifth shifting element of the transmission, locks the second planetary gearset RS2 in a shifted or engaged state, two other possibilities of two exemplary embodiments of a multi-speed transmission according to the invention for locking the cited second planetary gearset RS2 by way of the cited clutch E are shown in the following. FIG. 2 illustrates a second exemplary embodiment and FIG. 3 shows a third exemplary embodiment of a multi-speed transmission according to the invention, again in simplified schematic presentation, both based on the first exemplary embodiment of the inventive transmission explained in detail above with regard to FIG. 1.

It can be easily seen from FIG. 2 that the only difference, relative to the transmission kinematics of the second exemplary embodiment shown here, of a multi-speed transmission according to the invention in comparison to FIG. 1, is that the clutch E is now arranged within the power flow between the shaft 5 and the shaft 7. In the shifted or engaged state, the clutch E now therefore connects the carrier ST2 and the sun gear SO2 of the second planetary gear RS2.

It can also be seen in FIG. 2 that the most important difference in the shifting element arrangement inside the housing GG in the second exemplary embodiment of a multi-speed transmission, shown herein, in comparison with FIG. 1 is that the clutch E is now arranged with respect to the spatial layout within an area located axially between the second and third planetary gearsets RS2, RS3, and therein axially directly adjacent to the second planetary gearset RS2, wherein the clutch C is axially adjacent to the clutch E on the side of the clutch E that faces away from the planetary gearset RS2. On its side facing the planetary gearset RS2, the external disk carrier of the clutch E is connected to the carrier ST2 of this planetary gearset, and on its side facing away from the second planetary gearset RS2 to the external disk carrier of the clutch C, and via this external disk carrier of the clutch C, to the sun gear SO3 of the third planetary gearset RS3, thereby forming a section of shaft 5 of the transmission. The internal disk carrier of the clutch E is connected to the sun gear SO2 of the second planetary gearset RS2, and via this sun gear SO2, to the ring gear HO4 of the fourth planetary gearset RS4, thereby forming a section of shaft 7 of the transmission. A servo unit of the clutch E—not depicted in FIG. 2 for the purpose of simplification—can be simply mounted in an axially displaceable manner on the internal disk carrier of the clutch E and, therefore, rotates constantly at the rotational speed of the shaft 7; however, it can of course also be mounted in an axially displaceable manner on the external disk carrier of the clutch E to therefore rotate constantly at the rotational speed of the shaft 5. Here too, of course, known dynamic pressure compensation can also be provided for the servo unit of the clutch E.

As is also clearly seen in FIG. 2, it is advantageously possible in terms of manufacturing technology, to provide a common disk carrier for these to clutches C, E through the kinematic connection of the two clutches C and E to the shaft 5. If the disk sets of the two clutches C, E, as in the exemplary embodiment shown here (as an example), are arranged axially side-by-side at the same diameter, a common disk carrier of this kind can be configured as an external disk carrier for both clutches C, E, which, together with the carrier ST2 of the second planetary gearset RS2, or together with the sun gear SO3 of the third planetary gearset RS3, forms a preassembled arrangement. If required, however, the person skilled in the art will also consider other suitable constructive configurations of a common disk carrier for both clutches C, E. In the same manner, if needed in FIG. 2, the person skilled in the art will modify the example of spatial arrangement of the clutch D relative to the two clutches C, E and arrange the disk set of the clutch D, for example, at least in part radially above the disk set of the clutch D, or at least radially above the second planetary gearset RS2.

The exemplary embodiment of the inventive transmission, shown in FIG. 2, are reproduced, in regard to the spatial arrangement and constructive design of the shifting elements of FIG. 1, so that this description does not have to be repeated here.

It can clearly be seen in FIG. 3 that the only difference in transmission kinematics in the third exemplary embodiment of a multi-speed transmission according to the invention shown here in comparison with FIG. 1 is that the clutch E is now arranged within the power flow between the shaft 5 and the shaft 8. In the shifted or engaged state, the clutch E now therefore connects the carrier ST2 and the ring gear HO2 of the planetary gearset RS2. In the third exemplary embodiment of the inventive transmission shown herein, the spatial arrangement of the shifting elements and the planetary gearsets relative to each other, as well as the constructive design of the shifting elements and planetary gearsets were largely taken from FIG. 1, so that the following description can be limited to the details applicable to clutch E.

As can be seen in FIG. 3, the clutch E is now arranged with respect to the spatial layout within an area located axially between the second and third planetary gearsets RS2, RS3, and also axially adjacent to the second planetary gearset RS2, similar to the arrangement in FIG. 2. In contrast with FIG. 2, the disk set of the clutch E is now arranged with respect to the spatial layout within an area located radially above the clutch C. The external disk carrier of the clutch E forms a section of the shaft 8 of the transmission, is now connected at its side facing the second planetary gearset RS2 to the ring gear HO2 of that gearset, and is now also connected at its side facing away from the second planetary gearset RS2 to the internal disk carrier of the clutch D. The internal disk carrier of the clutch E now forms an additional section of the shaft 5 of the transmission and is connected to the carrier ST2 of the second planetary gearset RS2, the external disk carrier of the clutch C, and the sun gear SO3 of the third planetary gearset RS3. A servo unit of the clutch E, which is intended for the actuation of the disk set of the clutch E—which is not illustrated in FIG. 3, for the purpose of simplification—can easily be mounted in an axially displaceable manner on the internal disk carrier of the clutch E to therefore constantly at the rotational speed of the shaft 5. The servo unit of the clutch E can also be mounted in an axially displaceable manner on the external disk carrier of the clutch E to therefore rotate constantly at the rotational speed of the shaft 8.

It is obvious to the person skilled in the art that a common disk carrier can be respectively provided in an advantageous way, in terms of construction technology, for both the clutches C and E and the clutches D and E due to the special kinematic connection of the clutch E to the shafts 5 and 8 of the transmission. As an example of this, in FIG. 3, a common disk carrier of this type is designed for the clutches C, E as an internal disk carrier for the clutch E, a common disk carrier of this type for the clutches D, E as external disk carrier for the clutch E, and as internal disk carrier for the clutch D. If needed, a person skilled in the art will naturally also consider other suitable constructive designs for the disk carriers of the three clutches C, D, E.

In other respects, the exemplary embodiments shown in this context for FIG. 2 can also be transferred, at least analogously, to the exemplary embodiment of a transmission according to the invention shown in FIG. 3.

FIG. 4 illustrates a shift pattern, which can be provided for the inventive multi-speed transmission according to FIGS. 1, 2, and 3. In each gear, three shifting elements are engaged, and two shifting elements are disengaged. In addition to the shifting logic, examples of values of the respective transmission ratios in individual gear ratios i can be obtained along with the progressive ratio codes φ determined from them. The specified ratios i are obtained from the (typical) stationary transmission ratios of the four planetary gearsets RS1, RS2, RS3, RS4 of negative 2.00, positive 2.60, negative 3.70, and negative 2.00. In addition, it can be seen from the shift pattern that double shifts or range shifts can be avoided with sequential shifting, because two adjacent gears in the shifting logic use two shifting elements in common. The sixth gear is configured as a direct gear.

The first forward gear results by engaging the brakes A and B and the clutch C, the second forward gear results by engaging the brakes A and B and the clutch E, the third forward gear results by engaging the brake B and the clutches C and E, the fourth forward gear results by engaging the brake B and the clutches D and E, the fifth forward gear results by engaging the brake B and the clutches C and D, the sixth forward gear results by engaging the clutches C, D, and E, the seventh forward gear results by engaging the brake A and the clutches C and D, and the eighth forward gear results by engaging the brake A and the clutches D and E. As can also be seen from the shift pattern, the reverse gear results by engaging the brakes A and B and the clutch D.

According to the invention, it is possible to initiate driving the motor vehicle with a shifting element integrated into the transmission. A shifting element that is used in both the first forward gear and in the reverse gear, the brake A or the brake B is particularly suitable for this purpose in this case. Advantageously, both of these brakes, A, B are also required in the second forward gear. If the brake B is used as the starting element integrated into the transmission, it is even possible to initiate driving in the first five forward gears and the reverse gear. As can be seen from the shift pattern, the clutch C can also be used when starting in a forward direction and the clutch D can be used as an internal transmission starting element for initiating driving in a reverse direction.

Figure 5:
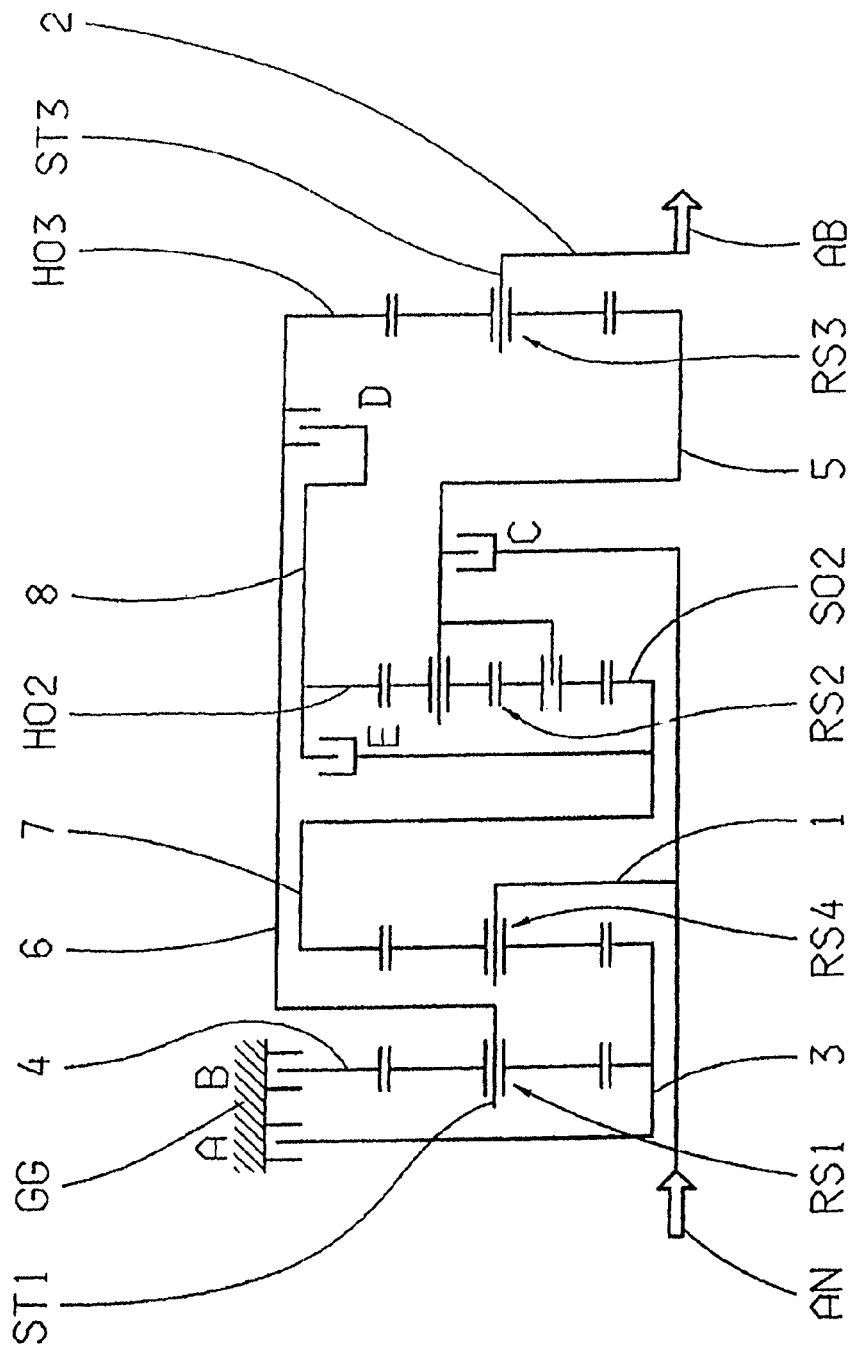
FIG. 5 shows a schematic representation of a fourth example of a multi-speed transmission according to the invention based on the gear arrangement according to FIG. 1.

FIG. 5 now shows a fourth exemplary embodiment of a multi-speed transmission according to the invention based on the first exemplary embodiment of a transmission according to the invention as explained in detail above with regard to FIG. 1. It is easy to see from FIG. 5 that the only difference with regard to the transmission kinematics of the fourth exemplary embodiment illustrated herein when compared to FIG. 1 consists in that the clutch D, as the fourth shifting element of the transmission, is now arranged within the power flow between the shaft 6 and the shaft 8 of the transmission. In a shifted or engaged state, the clutch D now connects the ring gear HO2 of the planetary gearset RS2 to the carrier ST1 of the first planetary gearset RS1 and the ring gear HO3 of the third planetary gearset RS3.

It is also easy to see in FIG. 5 that the spatial arrangement of the components of the transmission relative to each other within the transmission housing, except for the details applying to clutch D, is the same as that of FIG. 1. The following description, therefore, can be limited to these differing details. As can be seen in FIG. 5, the clutch D is axially arranged as in FIG. 1, with respect to the spatial layout, within an area located between the second and third planetary gearsets RS2, RS3. The person skilled in the art will be able without problem, however, to slightly modify this spatial arrangement of the clutch D, if needed, and arrange the disk set of the clutch D, for example, within an area located radially above the second planetary gearset RS2, or also within an area located axially between the second and fourth planetary gearsets RS2, RS4, and radially above the clutch E.

According to FIG. 5, the external disk carrier of the clutch D now forms a section of the shaft 6 of the transmission and is connected to the ring gear HO3 at its side facing the third planetary gearset RS3, and to the carrier ST1 of the first planetary gearset RS1 at its side facing away from the third planetary gearset RS3. Similar to FIG. 1, the internal disk carrier of the clutch D forms a section of the shaft 8 of the transmission and is connected to the ring gear HO2 at its side facing the second planetary gearset RS2, and to the external disk carrier of the clutch E via this ring gear HO2. A servo unit of the clutch D—not shown in detail in FIG. 5—for the actuation of its disk set can be arranged in a simple manner inside the cylindrical chamber formed by the external disk carrier of the clutch D and can be mounted in an axially displaceable manner on the said external disk carrier of the clutch D, to rotate constantly at the rotational speed of the shaft 6. The servo unit of the clutch D, however, can also be mounted in an axially displaceable manner on the internal disk carrier of the clutch D and to rotate constantly at the rotational speed of the shaft 8. The servo unit of the clutch D can feature a known dynamic pressure compensation.

Figure 6:
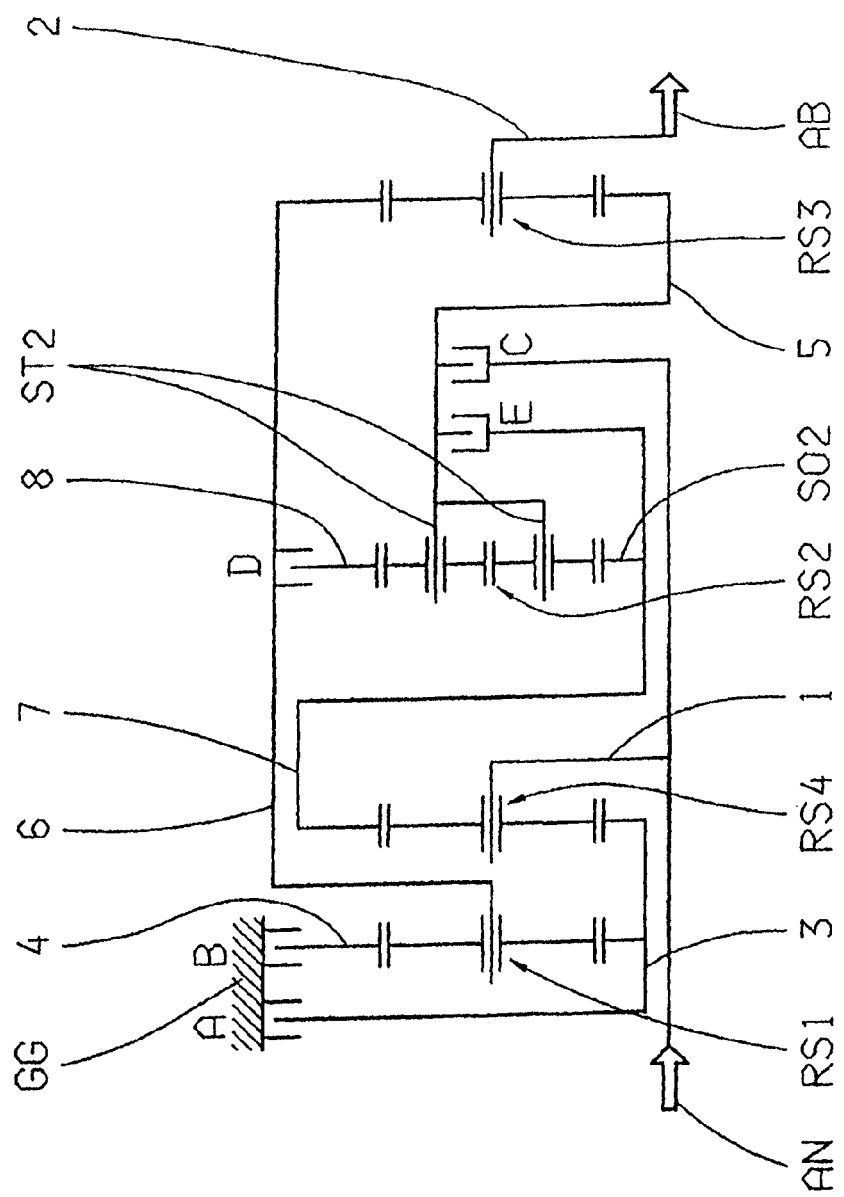
FIG. 6 shows a schematic representation of a fifth example of a multi-speed transmission according to the invention based on the gear arrangement according to FIG. 5.

Based on the consideration that the clutch E locks the second planetary gearset RS2 in a shifted or engaged state as the fifth shifting element of the transmission, the following two exemplary embodiments of a multi-speed transmission according to the invention illustrate two other possibilities for locking the second planetary gearset RS2 by way of the clutch E. FIG. 6 shows a fifth exemplary embodiment and FIG. 7 shows a sixth exemplary embodiment of a multi-speed transmission according to the invention, also in simplified schematic representation, both based on the fourth exemplary embodiment of an inventive transmission explained with reference to FIG. 5.

It can be clearly seen in FIG. 6 that the only difference with regard to transmission kinematics in the fifth exemplary embodiment of a multi-speed transmission according to the invention, illustrated herein, in comparison with FIG. 5 is that the clutch E is now arranged within the power flow between the shaft 5 and the shaft 7. In the shifted or engaged state, the clutch E now connects other the carrier ST2 and the sun gear SO2 of the planetary gearset RS2.

It is also obvious in FIG. 6 that the spatial arrangement of the components of the transmission relative to each other within the transmission housing is the same as that of FIG. 2, with the exception of the description applying to clutch D. The following description can therefore be limited to these differing details. As seen in FIG. 6, the clutch D is now arranged from a spatial point of view within an area located radially above the second planetary gearset RS2. This kind of arrangement option has already been discussed in connection with the description of FIG. 5.

Figure 7:
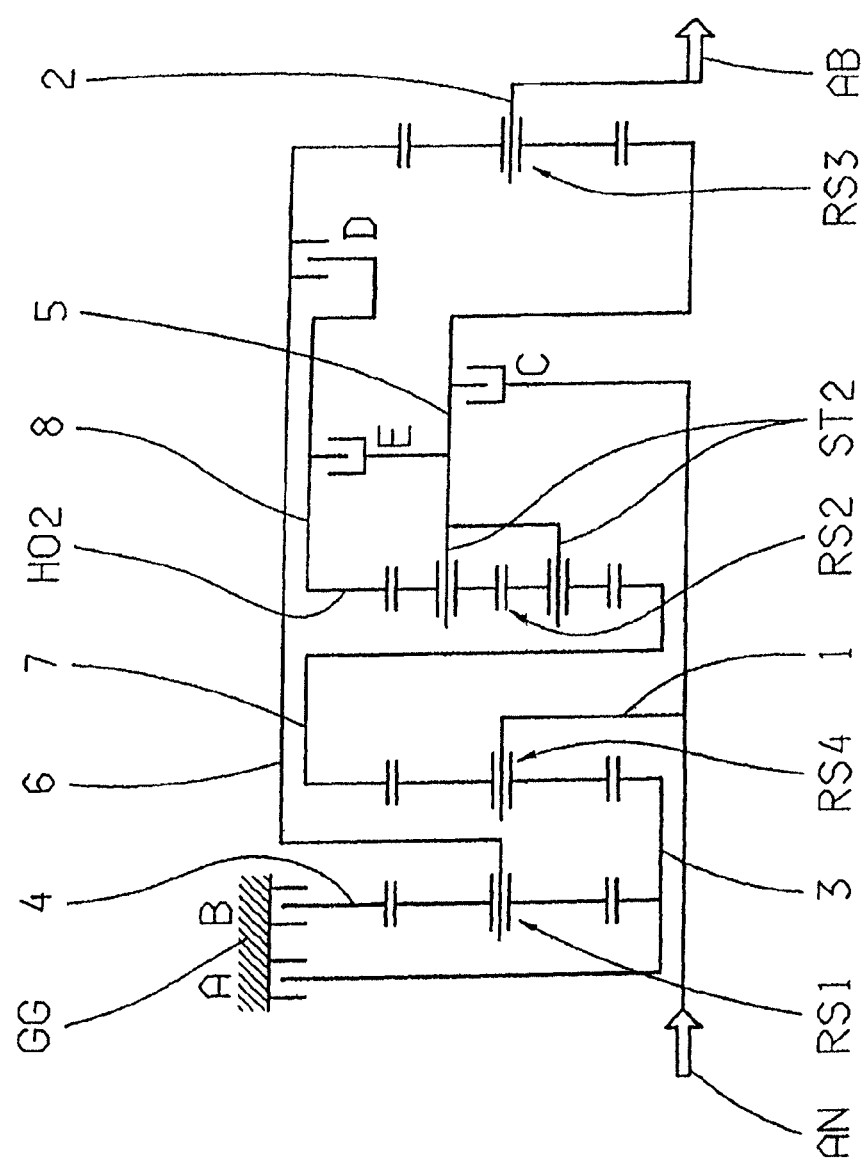
FIG. 7 shows a schematic representation of a sixth example of a multi-speed transmission according to the invention based on the gear arrangement according to FIG. 5.

It is clearly seen in FIG. 7 that the only difference with regard to the transmission kinematics in the sixth exemplary embodiment of a multi-speed transmission according to the invention, illustrated herein, in comparison with FIG. 5 is that the clutch E is now arranged within the power flow between the shaft 5 and the shaft 8. In the shifted or engaged state, the clutch E, therefore, now connects the carrier ST2 and the ring gear HO2 of the second planetary gearset RS2.

It is also clearly seen in FIG. 7 that the spatial arrangement of the components of the transmission relative to each other within the transmission housing remains unchanged, except for the description pertaining to clutch D. The following, therefore, will be limited to these deviating description. As seen in FIG. 7, the external disk carrier of the clutch D now forms a section of the shaft 6 of the transmission and is connected to the ring gear HO3 of that gearset on its side facing the third planetary gearset RS3, and to the carrier ST1 of the first planetary gearset RS1 on its side facing away from the third planetary gearset RS3. Similar to FIG. 3, the internal disk carrier of the clutch D forms a section of the shaft 8 of the transmission and is connected to the external disk carrier of the clutch E on its side facing the planetary gearset RS2 and to the ring gear HO2 of the second planetary gearset RS2. A servo unit of the clutch D—not shown in detail in FIG. 7—can be arranged in a simple manner inside the cylindrical chamber formed by the external disk carrier of the clutch D and can be mounted in an axially displaceable manner on the external disk carrier of the clutch D to rotate constantly at the rotational speed of the shaft 6, but can be displaceably mounted on the internal disk carrier of the clutch D to rotate constantly at the rotational speed of the shaft 8. The servo unit of the clutch D can also be provided with known dynamic pressure compensation.

Finally, in FIG. 8 illustrates a shift pattern that could be provided for the inventive multi-speed transmission according to the FIGS. 5, 6 and 7. In each gear, three shifting elements are engaged and two shifting elements are disengaged. In addition to the shifting logic, examples of values for the respective transmission ratios in individual gear ratios i can be obtained along with the progressive ratio codes φ determined from them. The specified ratios i are obtained from the (typical) stationary transmission ratios of the four planetary gearsets RS1, RS2, RS3, RS4 of negative 2.00, positive 2.00, negative 3.70, and negative 2.00. In addition, it can be seen from the shift pattern that double shifts or range shifts can be avoided with sequential shifting, because two adjacent gears in the shifting logic use two shifting elements in common. It can be clearly seen in FIG. 8 that the shifting logic is identical to that of FIG. 4, which is why it is not necessary to provide a more detailed description at this time. According to the different kinematic connections of the clutch D in comparison with the gearset diagrams illustrated in FIGS. 1, 2, and 3, and the slightly changed stationary transmission ratios of the second planetary gearset RS2 that are reasonable in this context, slightly different ratios i and progressive ratio codes φ are obtained for the gearset diagrams according to FIGS. 5, 6, and 7 in comparison with FIG. 4.

The following also applies to all of the previously illustrated or described exemplary embodiments of a multi-speed transmission according to the invention.

Figure 14:
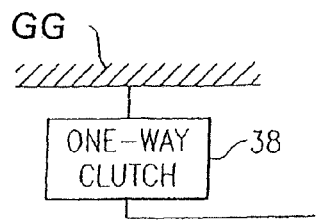
FIG. 14 is a diagrammatic view of an embodiment of the inventive multi-speed transmission having a one-way clutch.

According to the invention, different gear transitions can be produced, even with the same gear gearbox diagram, depending on the stationary gearing multiplication, which makes it possible to have variations specific to use or vehicle:

It is also possible, as shown in FIG. 14, to provide additional one-way clutches at any suitable position in the multi-speed transmission, for example, between a shaft and the housing, or in order to connect two shafts, if necessary.

Figure 9:
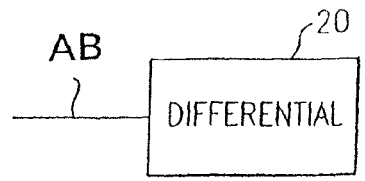
FIG. 9 is a diagrammatic view of an embodiment of the inventive multi-speed transmission having a differential.

An axle differential and/or a distributor differential 20 can be arranged on either the input side or the output side, as shown in FIG. 9.

Figure 10:
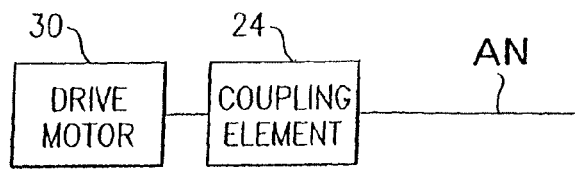
FIG. 10 is a diagrammatic view of an embodiment of the inventive multi-speed transmission with a coupling element and a drive motor.
Figure 11:
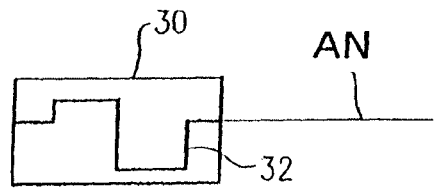
FIG. 11 is a diagrammatic view of an embodiment of the inventive multi-speed transmission with a crankshaft of the drive motor fixed to an input shaft of the multi-speed transmission.
Figure 18:
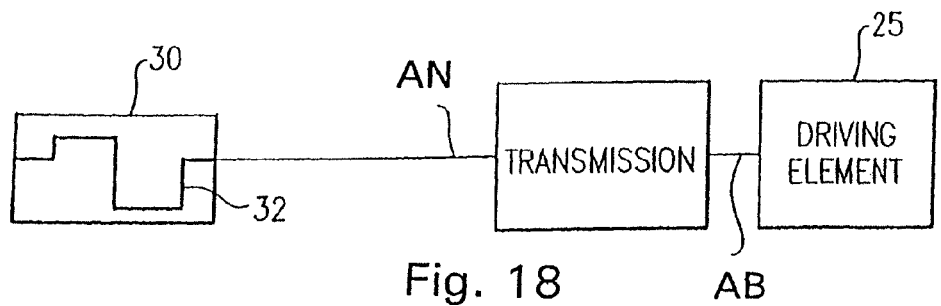
FIG. 18 is a diagrammatic view of another embodiment of the inventive multi-speed transmission with the crankshaft of the drive motor fixed to the input shaft of the multi-speed transmission and the coupling element located behind the multi-speed transmission.

In an advantageous further development, as shown in FIG. 10, the input shaft AN can be separated, if needed, by coupling element 24 from a drive motor 30, wherein a hydrodynamic converter, a hydraulic clutch, a dry starting clutch, a wet starting clutch, a magnetic particle clutch, or a centrifugal clutch can be used as such a coupling element. It is also possible, as shown in FIG. 18, to arrange a driving element 25 of this kind within the power flow behind the transmission, whereby in this case, as shown in FIG. 11, the input shaft AN is permanently connected to the crankshaft 32 of the drive motor 30.

Figure 12:
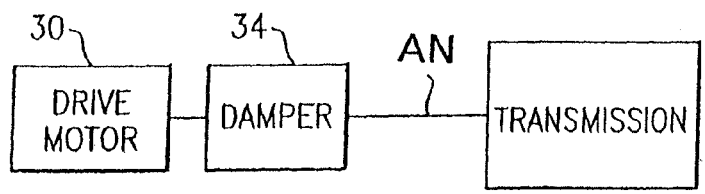
FIG. 12 is a diagrammatic view of an embodiment of the inventive multi-speed transmission having the drive motor communicating with a damper.

In addition, the multi-speed transmission according to the invention, as shown in FIG. 12, provides the possibility of arranging a torsional vibration damper 34 between the drive motor 30 and the transmission.

Figure 13:
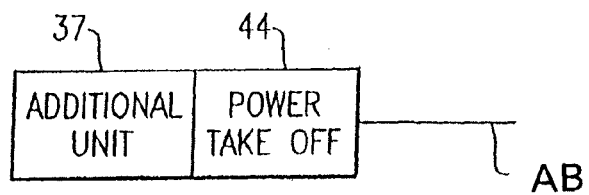
FIG. 13 is a diagrammatic view of an embodiment of the inventive multi-speed transmission with power take-off for driving an additional unit.
Figure 16:
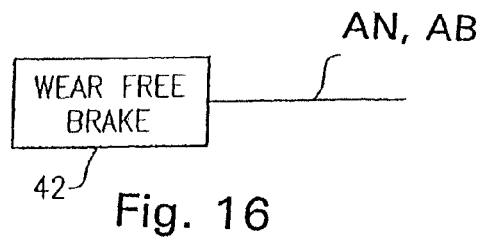
FIG. 16 is a diagrammatic view of a preferred design of the inventive multi-speed transmission having a wear free brake.
Figure 17:
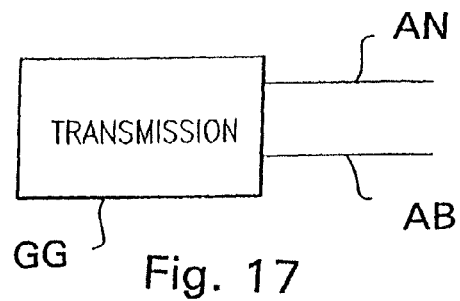
FIG. 17 is a diagrammatic view of a further embodiment of the invention with the input and the output being provided on the same side of the multi-speed transmission housing.

Within the scope of an additional embodiment of the invention, shown in FIG. 16, a wear free brake 42, such as a hydraulic or electric retarder, or the like can be arranged on the input shaft AN or the output shaft AB, which is particularly important for use in commercial vehicles. In addition, power take off 44 can be provided on each shaft, preferably on the input shaft AN or the output shaft AB, in order to drive additional units 37 on each shaft, as shown in FIG. 13. Additionally, as shown in FIG. 17, the input and the output can be provided on the same side of the transmission housing GG.

The shifting elements used can be configured as power-shifting clutches or brakes. In particular, non-positive clutches or brakes, such as disk clutches, band brakes and/or conical clutches, can be used. In addition, non-positive brakes and or/clutches, such as synchronizations or claw clutches, can be used as shifting elements.

Figure 15:
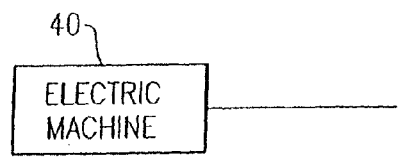
FIG. 15 is a diagrammatic view of an embodiment of the inventive multi-speed transmission with an electric machine.

A further advantage of the multi-speed transmission described herein, as shown in FIG. 15, is that an electric machine 40 can also be affixed to each shaft as a generator and/or auxiliary main engine.

Any constructive design, in particular every spatial arrangement of the planetary sets and the shifting elements per se, as well as with respect to each other, and insofar as technically practical, can be included under the scope of the protection of the claims, without influencing the function of the transmission as specified in the claims, even if these designs are not explicitly presented in the Figures or in the specification.

REFERENCE NUMERALS 1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2a outer planetary gears of the second planetary gearset
PL2i inner planetary gears of the second planetary gearset RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i transmission ratio
φ progressive ratio

The invention claimed is:
1. A multi-speed automatic transmission of a planetary design for a motor vehicle, the transmission comprising:
a transmission housing;
an input shaft;
an output shaft;
a first planetary gear set, a second planetary gear set, a third planetary gear set and a fourth planetary gear set; each of the first, the second, the third and the fourth planetary gear sets comprising three elements;
a first shifting element for releasably connecting one element of the first planetary gear set and one element of the fourth planetary gear set to the transmission housing;
a second shifting element for releasably connecting another element of the first planetary gear set to the transmission housing;
a third shifting element at least for releasably connecting one element of the third planetary gear set to the input shaft;
a fourth shifting element for releasably connecting one element of the third planetary gear set at least to one element of the second planetary gear set; and
a fifth shifting element for releasably connecting one element of the second planetary gear set at least to one element of the fourth planetary gear set;
wherein the input shaft is directly connected to one element of the fourth planetary gear set so as to constantly rotate in unison therewith;
the output shaft is directly connected to one element of the third planetary gear set so as to constantly rotate in unison therewith;
a third shaft directly connects one element of the first planetary gear set with one element of the fourth planetary gear set;
a fifth shaft directly connects one element of the second planetary gear set with one element of the third planetary gear set;
a sixth shaft directly connects one element of the first planetary gear set with one element of the third planetary gear set; and
a seventh shaft directly connects one element of the fourth planetary gear set with one element of the fifth shifting element.

2. The multi-speed automatic transmission according to claim 1, wherein the multi-speed automatic transmission comprises a plurality of forward gears and, for each forward gear, only two of the shifting elements are disengaged for establishing a desired forward gear ratio between the input shaft and the output shaft.

3. The multi-speed automatic transmission according to claim 2, wherein the plurality of forward gears comprises a first forward gear, a second forward gear, a third forward gear, a fourth forward gear, a fifth forward gear, a six forward gear, a seventh forward gear, an eighth forward gear and a reverse gear, the first shifting element is engaged at least in the first forward gear, in the second forward gear and in the reverse gear;
the second shifting element is engaged at least in the first forward gear, in the second forward gear, in the third forward gear, in the fourth forward gear, in the fifth forward gear and in the reverse gear;
the third shifting element is engaged at least in the first forward gear and in the third forward gear;
the fourth shifting element is engaged at least in the fourth forward gear and in the reverse gear; and
the fifth shifting element is engaged at least in the second forward gear, in the third forward gear and in the fourth forward gear.

4. The multi-speed automatic transmission according to claim 3, wherein the first shifting element is also engaged in the seventh forward gear and in the eight forward gear;
the second shifting element is also engaged in the fifth forward gear;
the third shifting element is engaged also in the fifth forward gear, in the sixth forward gear and in the seventh forward gear;
the fourth shifting element is also engaged in the fifth forward gear, in the sixth forward gear, in the seventh forward gear and in the eighth forward gear; and
the fifth shifting element is also engaged in the sixth forward gear and in the eighth forward gear.

5. A multi-speed automatic transmission of a planetary design for a motor vehicle, the transmission comprising:
a transmission housing;
an input shaft;
an output shaft;
a first planetary gear set, a second planetary gear set, a third planetary gear set and a fourth planetary gear set; each of the first, the second, the third and the fourth planetary gear sets comprising three elements;
a first shifting element for releasably connecting one element of the first planetary gear set and one element of the fourth planetary gear set to the transmission housing;
a second shifting element for releasably connecting another element of the first planetary gear set to the transmission housing;
a third shifting element at least for releasably connecting one element of the third planetary gear set to the input shaft;
a fourth shifting element for releasably connecting one element of the third planetary gear set at least to one element of the second planetary gear set; and
a fifth shifting element for releasably connecting one element of the second planetary gear set at least to one element of the fourth planetary gear set;
wherein the input shaft is directly connected to one element of the fourth planetary gear set so as to constantly rotate in unison therewith;
the output shaft is directly connected to one element of the third planetary gear set so as to constantly rotate in unison therewith;
a third shaft directly connects one element of the first planetary gear set with one element of the fourth planetary gear set;
a fifth shaft directly connects one element of the second planetary gear set with one element of the third planetary gear set;
a sixth shaft directly connects one element of the first planetary gear set with one element of the third planetary gear set;

a seventh shaft directly connects one element of the fourth planetary gear set with one element of the fifth shifting element; and the output shaft is also directly connected to one element of the fourth shifting element.

6. A multi-speed automatic transmission of a planetary design for a motor vehicle, the transmission comprising:
a transmission housing;
an input shaft;
an output shaft;
a first planetary gear set, a second planetary gear set, a third planetary gear set and a fourth planetary gear set;
each of the first, the second, the third and the fourth planetary gear sets comprising three elements;
a first shifting element for releasably connecting one element of the first planetary gear set and one element of the fourth planetary gear set to the transmission housing;
a second shifting element for releasably connecting another element of the first planetary gear set to the transmission housing;
a third shifting element at least for releasably connecting one element of the third planetary gear set to the input shaft;
a fourth shifting element for releasably connecting one element of the third planetary gear set to one element of the second planetary gear set; and
a fifth shifting element for releasably connecting one element of the second planetary gear set at least to one element of the fourth planetary gear set;
wherein the input shaft is directly connected to one element of the fourth planetary gear set so as to constantly rotate in unison therewith;
the output shaft is directly connected to one element of the third planetary gear set so as to constantly rotate in unison therewith;
a third shaft directly connects the one element of the first planetary gear set with the one element of the fourth planetary gear set;
a fifth shaft directly connects one element of the second planetary gear set with one element of the third planetary gear set;
a sixth shaft directly connects one element of the first planetary gear set with one element of the third planetary gear set; and
a seventh shaft directly connects one element of the fourth planetary gear set with one element of the fifth shifting element.

7. The multi-speed automatic transmission according to claim 6, wherein the output shaft is only directly connected to the third planetary gear set.

8. The multi-speed automatic transmission according to claim 6, wherein the multi-speed automatic transmission comprises a plurality of forward gears and, for each forward gear only two of the shifting elements are disengaged for establishing a desired forward gear ratio between the input shaft and the output shaft.

9. The multi-speed automatic transmission according to claim 8, wherein the plurality of forward gears comprises a first forward gear, a second forward gear, a third forward gear, a fourth forward gear, a fifth forward gear, a six forward gear, a seventh forward gear, an eighth forward gear and a reverse gear, the first shifting element is engaged at least in the first forward gear, in the second forward gear and in the reverse gear;
the second shifting element is engaged at least in the first forward gear, in the second forward gear; in the third forward gear, in the fourth forward gear and in the reverse gear;
the third shifting element is engaged at least in the first forward gear and in the third forward gear;
the fourth shifting element is engaged at least in the fourth forward gear and in the reverse gear; and
the fifth shifting element is engaged at least in the second forward gear, in the third forward gear and in the fourth forward gear.

10. The multi-speed automatic transmission according to claim 9, wherein the first shifting element is also engaged in the seventh forward gear and in the eight forward gear;
the second shifting element is also engaged in the fifth forward gear;
the third shifting element is also engaged in the fifth forward gear, in the sixth forward gear and in the seventh forward gear;
the fourth shifting element is also engaged in the fifth forward gear, in the sixth forward gear, in the seventh forward gear and in the eighth forward gear; and
the fifth shifting element is also engaged in the sixth forward gear and in the eighth forward gear.

* * * * *